June 19, 1951     K. J. SOUKUP ET AL     2,557,702

INTERNAL GAUGE

Filed Jan. 28, 1948

INVENTOR.
KENNETH J. SOUKUP
& JAMES H. BRADY
BY
*Richey & Watts*
ATTORNEYS

Patented June 19, 1951

2,557,702

UNITED STATES PATENT OFFICE 2,557,702

INTERNAL GAUGE

Kenneth J. Soukup and James H. Brady,
Cleveland, Ohio

Application January 28, 1948, Serial No. 4,764

3 Claims. (Cl. 33—162)

This invention relates broadly to gauges, and, more specifically, to an improved precision instrument for measuring bored holes in work pieces, checking broached splines and keyways, and gauging similar internal openings.

When measurements are taken with an inside caliper or similar instrument, error is apt to occur due to, first, the position in which the gauge is held within the bore, second, the pressure contact or so-called "feel" of the gauge, and, third, the adjustment and "feel" of the micrometer while measuring the inside caliper. If an inside caliper or any similar point contact gauge is held with the body thereof disposed in angular relation to the medial axis of the bore while taking a measurement, such measurement will be in error. Even the most highly skilled tool maker will, at times, fail to find the true diameter of the bore, since the mechanic must depend upon his eye and sense of "feel" to support the body of the caliper in coaxial relation with the bore.

The present invention contemplates an instrument which will overcome the foregoing difficulties by substituting line-contacting anvils for the rounded ends of the internal gauges heretofore in use and forming the instrument so that the anvils will be moved in parallel relation with each other during adjustment of the gauge.

Further advantages and objects of the invention reside in the provision of an instrument in which the work-contacting surfaces are formed from hardened and ground steel parts which are mounted to accommodate ready renewal thereof in the event of wear.

Another object of the invention is to provide a gauge which may be adjusted to facilitate trial reading at the machine so that the machinist can determine the amount of stock to be removed and simultaneously ascertain whether the boring or grinding tool is running out and forming a tapered hole.

Another object of the invention is to provide work contact elements in the gauge which are designed for line engagement with the full area of the anvils of a micrometer caliper, thus eliminating errors resulting from the improper support of the caliper relative to the gauge.

Further objects of the invention reside in the provision of a gauge which is light in weight, sturdy of structure, economic of manufacture, and designed to facilitate a more universal "feel" than has been possible heretofore with point contact gauges.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings.

Figure 1:
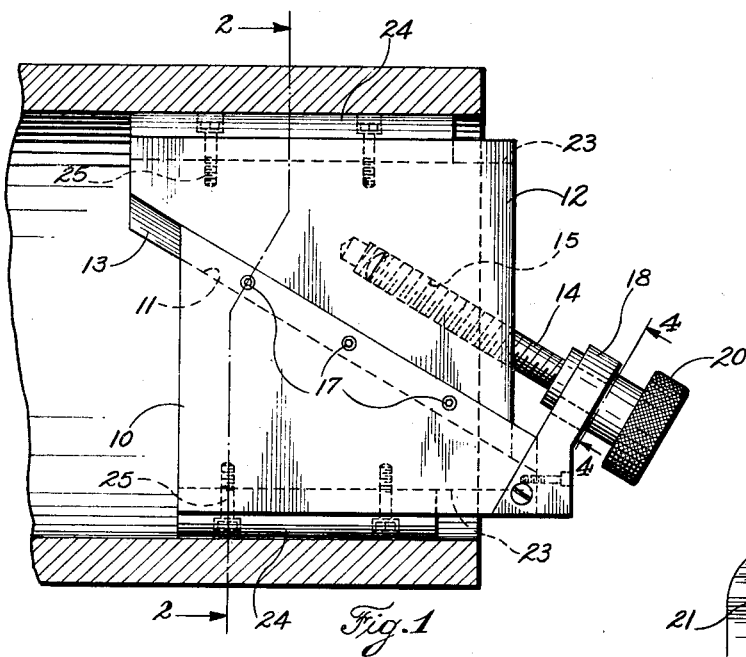
Fig. 1 is a side elevational view of the improved gauge, illustrated in place within the bore of a fragmentary section of a tubular body.
Figure 4:
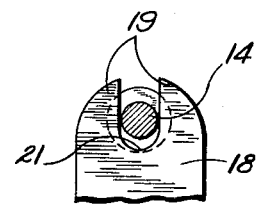
Fig. 4 is a vertical sectional view through the feed screw, the section being taken on a plane indicated by the line 4—4 in Fig. 1.
Figure 2:
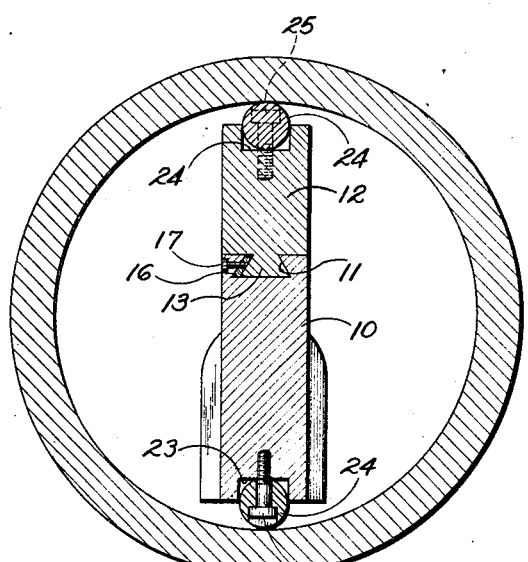
Fig. 2 is a vertical sectional view thereof, the section being taken on a plane indicated by the line 2—2 in Fig. 1.
Figure 3:
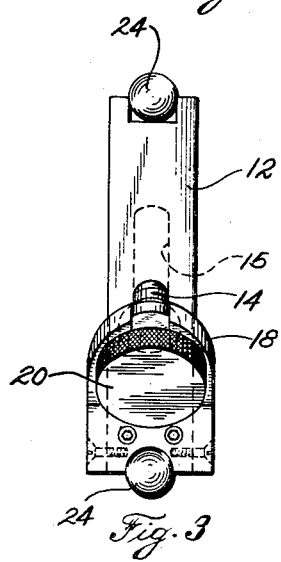
Fig. 3 is an end elevational view of the gauge illustrated in Fig. 1.

Referring first to Fig. 1, the gauge comprises a generally triangular base plate 10 having a dovetail groove 11 in the inclined face thereof, a similar upper plate 12 having a mating tenon 13 thereon and a feed screw 14 mounted on the base plate and engaged within a tapped hole 15 in the upper plate 12. The guide way or groove 11 is preferably machined to accommodate the reception of a gib or wear plate 16 which is held in place by machine screws 17 mounted in the base 10. The feed screw is supported in a bearing block 18 which may be attached, as shown herein, to the base plate or formed integrally therewith. The upper free end of the block 18 is bifurcated, the tines 19 thereof being of a requisite length to support the screw when the plate 12 is adjusted to its maximum distended position. The free end of the screw is provided with knurled knob 20 to accommodate rotative adjustments of the screw and the adjacent body thereof is machined with an annular groove 21 for the reception of the tines 19. The plates 10 and 12 are formed with grooves 23 in the side walls thereof which are machined to receive hardened and ground cylindrical contact rods or anvils 24. The width of the grooves is equal to the diameter of the rod to be seated therein, and the depth thereof is slightly greater than one-half the rod diameter. In order to assure optimum accuracy of parallelism of the anvil rods throughout the range of adjustment of the gauge, the grooves are machined while the plates are mounted in assembled relation with each other and after the dovetail mortise and tenon have been lapped in place. The anvil rods are cross-drilled and countersunk for the reception of cap screws 25 threaded in tapped holes in the base wall of the respective grooves. Although the anvils 24 as shown herein are formed from cylindrical stock, it will be understood that they may be formed in profile of a gear tooth, a square, a triangle, or of any other desired shape.

In operation, the feed screw 14 is adjusted to move the plate 12 upwardly or downwardly along its inclined surface until the sides of the gauge may be inserted into the bore of the work under inspection. The screw may then be further adjusted until the anvils are brought into engagement, with the desired frictional resistance, upon the walls of the bore. In this operation the gauge may be rotated slightly, while the screw is simultaneously adjusted, until the freedom of such movement is reduced to a minimum. The gauge may then be moved longitudinally to determine whether or not the bore is tapered. Thereafter, the gauge may be removed from the work and measured with a micrometer caliper, where it will be noted that an accurate reading may be taken, since the anvils of the micrometer may be brought into full line engagement with the rods or anvils of the gauge.

In measuring keyways, broached splines, and similar recesses, the same technique may be followed, save that the gauge anvils will be brought to bear upon the root of the groove or grooves. In such operations it is assumed, of course, that a gauge of a requisite width will be employed to permit the free entry of the anvils between the side walls of the groove.

From the foregoing, it will be recognized that the lineal contact of the anvil rods in the opening will float the gauge in aligned relation with the medial axis of the bore, that the true diameter of the bore may be readily found, that micrometer, electronic, or comparator gauge readings may be taken with greater accuracy, and that an opening in a work piece may be checked for taper and circular symmetry with greater accuracy and dispatch than has been heretofore possible with a point contact gauge.

Although the foregoing description is necessarily of a detailed character, in order that the invention may be completely set forth, it is to be understood that the specific terminology is not intended to be restrictive or confining, and that various rearrangements of parts and modifications of detail may be resorted to, including such changes as may be necessary to facilitate the use of an electronic gauge, without departing from the scope or spirit of the invention as herein claimed.

We claim:

1. A gauge for measuring the diameter of a hole comprising a pair of wedge plates united along the inclined faces thereof by a dovetail mortise and tenon, a screw mounted for free rotative movement on an end portion of one of said plates and threaded into the body of the other plate, the edges of the bases of said plates having grooves therein, and mutually parallel cylindrical anvil rods in said grooves.

2. An internal gauge comprising a pair of substantially triangular plates, inter-engaged dovetail connections on the inclined edges thereof, a screw threaded in one of said plates and mounted for free rotative movement on the other plate, said plates having grooves in the bases thereof machined after assembly of the plates to maintain the parallel relation thereof, and formed work-engaging anvils in said grooves extending substantially the entire length of the plates.

3. An instrument for measuring the diameter of a hole comprising a tapered plate having a dovetail groove constituting a mortise in the inclined face thereof, a second plate of similar form, a dovetail tenon thereon, said plates being assembled with the mortise and tenon in interlocked relation and with the bases of the respective plates parallel, a gib intermediate adjacent side walls of the mortise and tenon disposed longitudinally of the mortise, a bifurcated bracket mounted on one of said plates, a screw having an annular groove in the shank thereof threaded into one of the plates and mounted with the groove disposed between the furcations of said bracket, said plates having grooves in the parallel edges thereof, and hardened and ground cylindrical rods detachably mounted in said grooves.

KENNETH J. SOUKUP.
JAMES H. BRADY.

REFERENCES CITED

The following references are of record in the file of this patent:

UNITED STATES PATENTS

| Number | Name | Date |
| --- | --- | --- |
| 539,492 | Stone | May 21, 1895 |
| 875,050 | Conlon | Dec. 31, 1907 |
| 1,090,901 | Beckwith | Mar. 24, 1914 |
| 1,556,666 | Bath et al. | Oct. 13, 1925 |
| 2,117,526 | Sunnen | May 17, 1938 |
| 2,351,105 | Casali | June 13, 1944 |
| 2,353,886 | Findley et al. | July 18, 1944 |
| 2,397,492 | Koning | Apr. 2, 1946 |

FOREIGN PATENTS

| Number | Country | Date |
| --- | --- | --- |
| 148,574 | Great Britain | July 10, 1920 |
| 554,054 | Great Britain | June 17, 1943 |